(12) United States Patent
Kang et al.

(10) Patent No.: US 11,064,026 B2
(45) Date of Patent: Jul. 13, 2021

(54) APPARATUS AND METHOD FOR SHARING SECURITY THREAT INFORMATION

(71) Applicant: ELECTRONICS AND TELECOMMUNICATIONS RESEARCH INSTITUTE, Daejeon (KR)

(72) Inventors: Byeongho Kang, Seoul (KR); Cheolho Lee, Daejeon (KR)

(73) Assignee: ELECTRONICS AND TELECOMMUNICATIONS RESEARCH INSTITUTE, Daejeon (KR)

(\*) Notice: Subject to any disclaimer, the term of this patent is extended or adjusted under 35 U.S.C. 154(b) by 358 days.

(21) Appl. No.: 16/299,506

(22) Filed: Mar. 12, 2019

(65) Prior Publication Data

US 2019/0334989 A1 Oct. 31, 2019

(30) Foreign Application Priority Data

Apr. 25, 2018 (KR) .......... 10-2018-0048084

(51) Int. Cl.
*H04L 9/00* (2006.01)
*H04L 29/08* (2006.01)
*G06F 21/53* (2013.01)
*H04L 29/06* (2006.01)

(52) U.S. Cl.
CPC .......... *H04L 67/1097* (2013.01); *G06F 21/53* (2013.01); *H04L 63/1416* (2013.01)

(58) Field of Classification Search
CPC ........ G06F 21/51; G06F 21/53; G06F 21/577; H04L 63/1416; H04L 63/0263; H04L 63/1441; H04L 63/20
See application file for complete search history.

(56) References Cited

U.S. PATENT DOCUMENTS

| | | | |
|---|---|---|---|
| 9,130,983 | B2 | 9/2015 | Heo et al. |
| 9,858,626 | B2 | 1/2018 | Alperovitch et al. |
| 10,057,279 | B1* | 8/2018 | Balduzzi ................. G06F 21/56 |
| 2012/0110633 | A1 | 5/2012 | An et al. |
| 2013/0205361 | A1* | 8/2013 | Narayanaswamy ........................ H04W 12/128 726/1 |

(Continued)

FOREIGN PATENT DOCUMENTS

| | | |
|---|---|---|
| JP | 2015-524585 A | 8/2015 |
| KR | 10-0862194 B1 | 10/2008 |

(Continued)

*Primary Examiner* — Beemnet W Dada
(74) *Attorney, Agent, or Firm* — LRK Patent Law Firm

(57) ABSTRACT

A method for sharing security threat information, performed by an apparatus for sharing security threat information, includes downloading a detection rule from a TAXII server and storing the same in a detection rule and result storage unit; performing detection for a detection target, which includes at least one of an Observed Data object, a file that is not in a STIX format, and a PCAP file, using the detection rule; generating a detection result, which is a result of the detection, using at least one of a Sighting object, a File object, and an Artifact object; and uploading the generated detection result to the TAXII server in order to share security threat information including the detection result.

17 Claims, 15 Drawing Sheets

(56) References Cited

U.S. PATENT DOCUMENTS

| | | | | |
|---|---|---|---|---|
| 2015/0295943 A1* | 10/2015 | Malachi | .............. | H04L 63/1416 |
| | | | | 726/24 |
| 2015/0373040 A1* | 12/2015 | Sander | ................ | H04L 63/1425 |
| | | | | 726/22 |
| 2016/0366174 A1 | 12/2016 | Chernin et al. | | |
| 2018/0077190 A1* | 3/2018 | Mowry | ................. | G06F 16/248 |
| 2018/0097774 A1* | 4/2018 | Ore | ......................... | H04L 45/28 |
| 2018/0139217 A1* | 5/2018 | Snapiri | ............... | H04L 47/2441 |

FOREIGN PATENT DOCUMENTS

| | | | |
|---|---|---|---|
| KR | 10-2012-0046891 A | | 5/2012 |
| KR | 10-2014-0118494 A | | 10/2014 |
| KR | 10-2017-0135495 A | | 12/2017 |
| KR | 10-1814368 B1 | | 1/2018 |
| WO | 2008/083267 A2 | | 7/2008 |

* cited by examiner

| STIX OBJECT | PROPERTY | TYPE | REQUIRED (BASED ON STIX) | REQUIRED (BASED ON THE PRESENT SPECIFICATION) | DESCRIPTION |
|---|---|---|---|---|---|
| OBSERVED-DATA | TYPE | STRING | REQUIRED | REQUIRED | THE OBJECT TYPE (=OBSERVED-DATA) |
| | ID | IDENTIFIER | REQUIRED | REQUIRED | THE IDENTIFIER OF THE OBSERVED-DATA OBJECT |
| | CREATED_BY_REF | IDENTIFIER | OPTIONAL | OPTIONAL | THE IDENTIFIER OF AN IDENTITY OBJECT DESCRIBING THE ENTITY THAT CREATED THE OBSERVED-DATA OBJECT |
| | CREATED | TIMESTAMP | REQUIRED | REQUIRED | THE TIME AT WHICH THE OBSERVED-DATA OBJECT WAS FIRST CREATED |
| | MODIFIED | TIMESTAMP | REQUIRED | REQUIRED | THE TIME AT WHICH THE OBSERVED-DATA OBJECT WAS MOST RECENTLY MODIFIED |
| | FIRST_OBSERVED | TIMESTAMP | REQUIRED | REQUIRED | THE TIME AT WHICH THE OBSERVABLE-OBJECTS OBJECT WAS FIRST OBSERVED |
| | LAST_OBSERVED | TIMESTAMP | REQUIRED | REQUIRED | THE TIME AT WHICH THE OBSERVABLE-OBJECTS OBJECT WAS MOST RECENTLY OBSERVED |
| | NUMBER_OBSERVED | INTEGER | REQUIRED | REQUIRED | THE NUMBER OF TIMES THE OBSERVABLE-OBJECTS OBJECT WAS OBSERVED |
| | OBJECTS | OBSERVABLE-OBJECTS | REQUIRED | REQUIRED | THE CORRESPONDING OBSERVABLE-OBJECTS |

FIG. 5

```
{
  "type": "observed-data",
  "id": "observed-data--b67d30ff-02ac-498a-92f9-32f845f448cf",
  "created_by_ref": "identity--f431f809-377b-45e0-aa1c-6a4751cae5ff",
  "created": "2016-04-06T19:58:16.000Z",
  "modified": "2016-04-06T19:58:16.000Z",
  "first_observed": "2016-04-06T19:58:16.000Z",
  "last_observed": "2016-04-06T19:58:16.000Z",
  "number_observed": 1,
  "objects": { "0": {"type": "file", ...},
  "1": {...}
  }
}
```

FIG. 6

| STIX OBJECT | PROPERTY | TYPE | REQUIRED (BASED ON STIX) | REQUIRED (BASED ON THE PRESENT SPECIFICATION) | DESCRIPTION |
|---|---|---|---|---|---|
| INDICATOR | TYPE | STRING | REQUIRED | REQUIRED | THE OBJECT TYPE (=INDICATOR) |
| | ID | IDENTIFIER | REQUIRED | REQUIRED | THE IDENTIFIER OF THE INDICATOR OBJECT |
| | CREATED_BY_REF | IDENTIFIER | OPTIONAL | OPTIONAL | THE IDENTIFIER OF AN IDENTITY OBJECT DESCRIBING THE ENTITY THAT CREATED THE INDICATOR OBJECT |
| | CREATED | TIMESTAMP | REQUIRED | REQUIRED | THE TIME AT WHICH THE INDICATOR OBJECT WAS FIRST CREATED |
| | MODIFIED | TIMESTAMP | REQUIRED | REQUIRED | THE TIME AT WHICH THE INDICATOR OBJECT WAS MOST RECENTLY MODIFIED |
| | REVOKED | BOOLEAN | OPTIONAL | OPTIONAL | WHETHER THE INDICATOR OBJECT WAS REVOKED |
| | LABELS | LIST OF TYPE STRING | REQUIRED | REQUIRED | THE VOCABULARY THAT SPECIFIES THE TYPE OF THE INDICATOR OBJECT (E.G., MALICIOUS ACTIVITY, ETC.) |
| | NAME | STRING | OPTIONAL | OPTIONAL | THE NAME OF THE INDICATOR OBJECT |
| | DESCRIPTION | STRING | OPTIONAL | OPTIONAL | THE DESCRIPTION OF THE INDICATOR OBJECT |
| | PATTERN | STRING | REQUIRED | REQUIRED | THE STIX PATTERN |
| | X_YARA_PATTERN | STRING | - | OPTIONAL | THE YARA PATTERN |
| | X_SNORT_PATTERN | STRING | - | OPTIONAL | THE SNORT PATTERN |
| | VALID_FROM | TIMESTAMP | REQUIRED | REQUIRED | THE PERIOD FOR WHICH THE INDICATOR OBJECT IS VALID |
| | VALID_UNTIL | TIMESTAMP | OPTIONAL | OPTIONAL | |
| | OBJECT_MARKING_REFS | LIST OF TYPE IDENTIFIER | OPTIONAL | OPTIONAL | THE IDENTIFIERS OF MARKING-DEFINITION OBJECTS FOR REPRESENTING THE PURPOSE OF THE INDICATOR OBJECT |

FIG. 7

```
{
  "type": "identity",
  "id": "identity--e88ab115-7768-4630-baa3-3d49a7d946ea",
  "created": "2017-05-15T09:00:00.000000Z",
  "modified": "2017-05-15T09:00:00.000000Z",
  "name": "example.go.kr",
  "description": "example.go.kr 's operation   ",
  "identity_class": "organization",
  "sectors": [
    "government-national"
  ],
  "contact_information": "HONG, 02-2222-2222, admin@example.go.kr"
},
{
  "type": "marking-definition",
  "id": "marking-definition--34098fce-860f-48ae-8e50-ebd3cc5e41da",
  "created_by_ref": "identity--e88ab115-7768-4630-baa3-3d49a7d946ea",
  "created": "2017-05-15T09:00:00.000000Z",
  "definition_type": "statement",
  "definition": {
      "statement":  "malicious file detection framework"
   }
},
{
  "type": "indicator",
  "id": "indicator--8e2e2d2b-17d4-4cbf-938f-98ee46b3cd3f",
  "created_by_ref": "identity--e88ab115-7768-4630-baa3-3d49a7d946ea",
  "created": "2017-05-15T20:03:48Z", "modified": "2017-05-15T20:03:48Z",
  "labels": [
      "malicious-activity"
   ],
  "name": "Poison Ivy Malware",
  "description": "This file is part of Poison Ivy",
  "pattern": "", "x_yara_pattern":"rule indicat----8e2e2d2b-17d4-4cbf-938f-98ee46b3cd3f : rat { strings: $a = {53 74 75 62 50 61 74 68 ?? 53 4f 46 54 57 41} conditio n: $a }",
    "valid_from": "2016-01-01T00:00:00Z",
    "object_marking_refs": [
        "marking-definition--34098fce-860f-48ae-8e50-ebd3cc5e41da"
     ]
}
```

FIG. 8

| STIX OBJECT | PROPERTY | TYPE | REQUIRED (BASED ON STIX) | REQUIRED (BASED ON THE PRESENT SPECIFICATION) | DESCRIPTION |
|---|---|---|---|---|---|
| FILE | TYPE | STRING | REQUIRED | REQUIRED | THE OBJECT TYPE(=FILE) |
| | HASHES | HASHES-TYPE | OPTIONAL | REQUIRED | ALL OF THREE TYPES OF HASH VALUES INCLUDING MD5, SHA-1, AND SHA-256 |
| | SIZE | INTEGER | OPTIONAL | REQUIRED | THE SIZE OF THE FILE (BYTES) |
| | NAME | STRING | OPTIONAL | OPTIONAL | THE NAME OF THE FILE (EXCLUDING THE PATH) |
| | MIME_TYPE | STRING | OPTIONAL | OPTIONAL | THE MIME TYPE OF THE FILE |
| | CREATED | TIMESTAMP | REQUIRED | REQUIRED | THE TIME AT WHICH THE FILE WAS CREATED |
| | MODIFIED | TIMESTAMP | REQUIRED | REQUIRED | THE TIME AT WHICH THE FILE WAS MOST RECENTLY MODIFIED |
| | ACCESSED | TIMESTAMP | REQUIRED | REQUIRED | THE TIME AT WHICH THE FILE WAS MOST RECENTLY ACCESSED |

FIG. 9

```
{
  "type": "observed-data",
  "id": "observed-data--b67d30ff-02ac-498a-92f9-32f845f448cf",
  "created_by_ref": "identity--f431f809-377b-45e0-aa1c-6a4751cae5ff",
  "created": "2016-04-06T19:58:16.000Z",
  "modified": "2016-04-06T19:58:16.000Z",
  "first_observed": "2016-04-06T19:58:16.000Z",
  "last_observed": "2016-04-06T19:58:16.000Z",
  "number_observed": 1,
  "objects": {
  "0": {
    "type": "file",
    "hashes": {
       "MD5": "66e2ea40dc71d5ba701574ea215a81f1",
       "SHA-1": "3a962bfd90b96ba2155affc7ab95de5f02c92daa",
       "SHA-256": "bf07a7fbb825fc0aae7bf4a1177b2b31fcf8a3feeaf7092761e18c859ee52a9c"
        },
        "size": 2197,
        "name": "qwerty.dll",
        "created": "2016-01-01T00:00:00Z",
        "modified": "2016-01-01T00:00:00Z",
        "accessed": "2016-01-01T00:00:00Z"
     }
  }
}
```

FIG. 10

| STIX OBJECT | PROPERTY | TYPE | REQUIRED (BASED ON STIX) | REQUIRED (BASED ON THE PRESENT SPECIFICATION) | DESCRIPTION |
|---|---|---|---|---|---|
| DOMAIN-NAME | TYPE | STRING | REQUIRED | REQUIRED | OBJECT TYPE (=OBSERVED-DATA) |
| | VALUE | STRING | REQUIRED | REQUIRED | THE DOMAIN NAME EXTRACTED FROM A DNS PACKET OF PCAP |
| IPV4-ADDR | TYPE | STRING | REQUIRED | REQUIRED | OBJECT TYPE(=IPV4-ADDR) |
| | VALUE | STRING | REQUIRED | REQUIRED | THE IPV4 ADDRESS EXTRACTED FROM AN IP PACKET OF PCAP |
| URL | TYPE | STRING | REQUIRED | REQUIRED | OBJECT TYPE(=URL) |
| | VALUE | STRING | REQUIRED | REQUIRED | THE URL EXTRACTED FROM AN HTTP PACKET OF PCAP |
| FILE | TYPE | STRING | REQUIRED | REQUIRED | THE OBJECT TYPE(=URL) - THE PCAP FILE |
| | HASHES | HASHES-TYPE | OPTIONAL | REQUIRED | MD5, SHA-1, AND SHA-256 OF THE PCAP FILE |
| | SIZE | INTEGER | OPTIONAL | REQUIRED | THE SIZE OF THE PCAP FILE(BYTES) |
| | NAME | STRING | OPTIONAL | OPTIONAL | THE NAME OF THE PCAP FILE (EXCLUDING THE PATH) |
| | MIME_TYPE | STRING | OPTIONAL | REQUIRED | APPLICATION/ VND.TCPDUMP.PCAP |
| | CREATED | TIMESTAMP | REQUIRED | REQUIRED | THE TIME AT WHICH THE PCAP FILE WAS CREATED |
| | MODIFIED | TIMESTAMP | REQUIRED | REQUIRED | THE TIME AT WHICH THE PCAP FILE WAS MOST RECENTLY MODIFIED |
| | ACCESSED | TIMESTAMP | REQUIRED | REQUIRED | THE TIME AT WHICH THE PCAP FILE WAS MOST RECENTLY ACCESSED |

FIG. 11

```
{
  "type": "observed-data",
  "id": "observed-data--b67d30ff-02ac-498a-92f9-32f845f448cf",
  "created_by_ref": "identity--f431f809-377b-45e0-aa1c-6a4751cae5ff",
  "created": "2016-04-06T19:58:16.000Z",
  "modified": "2016-04-06T19:58:16.000Z",
  "first_observed": "2016-04-06T19:58:16.000Z",
  "last_observed": "2016-04-06T19:58:16.000Z",
  "number_observed": 1,
  "objects": {
    "0": {
      "type": "file",
      "hashes": { "md5": "66e2ea40dc71d5ba701574ea215a81f1",
      "sha-1": "3a962bfd90b96ba2155affc7ab95de5f02c92daa",
      "sha-256": "bf07a7fbb825fc0aae7bf4a1177b2b31fcf8a3feeaf7092761e18c859ee52a9c"
      },
      "size": 329576,
      "name": "packet_dump.pcap",
      "mime_type":"application/vnd.tcpdump.pcap",
      "parent_directory_ref": "0",
      "created": "2016-01-01T00:00:00Z",
      "modified": "2016-01-01T00:00:00Z",
      "accessed": "2016-01-01T00:00:00Z"
    },
    "1":{
      "type":"domain-name",
      "value":"attacker.com"
    },
    "2":{
      "type":"ipv4-addr",
      "value":"203.37.2.97"
    },
    "3":{
      "type":"url",
      "value":"http://attacker.com/command.php?zombie_id=3321"
    }
  }
}
```

FIG. 12

| STIX OBJECT | PROPERTY | TYPE | REQUIRED (BASED ON STIX) | REQUIRED (BASED ON THE PRESENT SPECIFICATION) | DESCRIPTION |
|---|---|---|---|---|---|
| SIGHTING | TYPE | STRING | REQUIRED | REQUIRED | THE OBJECT TYPE (=SIGHTING) |
| | ID | IDENTIFIER | REQUIRED | REQUIRED | THE IDENTIFIER OF THE SIGHTING OBJECT |
| | CREATED_BY_REF | IDENTIFIER | OPTIONAL | OPTIONAL | THE IDENTIFIER OF AN IDENTITY OBJECT DESCRIBING THE ENTITY THAT CREATED THE SIGHTING OBJECT |
| | CREATED | TIMESTAMP | REQUIRED | REQUIRED | THE TIME AT WHICH THE SIGHTING OBJECT WAS FIRST CREATED |
| | MODIFIED | TIMESTAMP | REQUIRED | REQUIRED | THE TIME AT WHICH THE SIGHTING OBJECT WAS MOST RECENTLY MODIFIED |
| | REVOKED | BOOLEAN | OPTIONAL | OPTIONAL | WHETHER THE SIGHTING OBJECT WAS REVOKED |
| | FIRST_SEEN | TIMESTAMP | OPTIONAL | OPTIONAL | THE TIME AT WHICH THE OBJECT MATCHING THE INDICATOR WAS FIRST OBSERVED |
| | LAST_SEEN | TIMESTAMP | OPTIONAL | OPTIONAL | THE TIME AT WHICH THE OBJECT MATCHING THE INDICATOR WAS MOST RECENTLY OBSERVED |
| | COUNT | INTEGER | OPTIONAL | OPTIONAL | THE NUMBER OF TIMES THE OBJECT MATCHING THE INDICATOR WAS OBSERVED |
| | SIGHTING_OF_REF | IDENTIFIER | REQUIRED | REQUIRED | THE IDENTIFIER OF THE INDICATOR OBJECT |
| | OBSERVED_DATA_REFS | LIST OF TYPE IDENTIFIER | OPTIONAL | OPTIONAL | THE LIST OF THE IDENTIFIERS OF OBSERVED-DATA OBJECTS |
| | WHERE_SIGHTED_REFS | LIST OF TYPE IDENTIFIER | OPTIONAL | OPTIONAL | THE LIST OF THE IDENTIFIERS OF IDENTITY OBJECTS DESCRIBING THE ENTITIES THAT SIGHTED TARGETS |

FIG. 13

```
{
    "type": "sighting",
    "id": "sighting--ee20065d-2555-424f-ad9e-0f8428623c75",
    "created_by_ref": "identity--f431f809-377b-45e0-aa1c-6a4751cae5ff",
    "created": "2016-04-06T20:08:31.000Z",
    "modified": "2016-04-06T20:08:31.000Z",
    "first_seen": "2015-12-21T19:00:00Z",
    "last_seen": "2015-12-21T19:00:00Z",
    "count": 50,
    "sighting_of_ref": "indicator--8e2e2d2b-17d4-4cbf-938f-98ee46b3cd3f",
    "observed_data_refs": ["observed-data--b67d30ff-02ac-498a-92f9-32f845f448cf"],
    "where_sighted_refs": ["identity--b67d30ff-02ac-498a-92f9-32f845f448ff"]
}
```

FIG. 14

| STIX OBJECT | PROPERTY | TYPE | REQUIRED (BASED ON STIX) | REQUIRED (BASED ON THE PRESENT SPECIFICATION) | DESCRIPTION |
|---|---|---|---|---|---|
| ARTIFACT | TYPE | STRING | REQUIRED | REQUIRED | THE OBJECT TYPE (=ARTIFACT) |
| | MIME_TYPE | STRING | REQUIRED | OPTIONAL | REFERENCE TO IANA MEDIA TYPE REGISTRY |
| | PAYLOAD_BIN | BINARY | OPTIONAL | REQUIRED | BASE 64 ENCODING OF THE ACTUALLY DETECTED FILE |
| | HASHES | HASHES-TYPE | OPTIONAL | REQUIRED | THREE TYPES OF HASHES INCLUDING MD5, SHA-1, AND SHA-256 OF THE ACTUALLY DETECTED FILE |

FIG. 15

```
{
  "type": "observed-data",
  "id": "observed-data--b67d30ff-02ac-498a-92f9-32f845f448cf",
  "created_by_ref": "identity--f431f809-377b-45e0-aa1c-6a4751cae5ff",
  "created": "2016-04-06T19:58:16.000Z",
  "modified": "2016-04-06T19:58:16.000Z",
  "first_observed": "2016-04-06T19:58:16.000Z",
  "last_observed": "2016-04-06T19:58:16.000Z",
  "number_observed": 1,
  "objects": {
     "0": {
        "type": "file",
        "hashes": {
           "md5": "66e2ea40dc71d5ba701574ea215a81f1",
           "sha-1": "3a962bfd90b96ba2155affc7ab95de5f02c92daa",
           "sha-256": "bf07a7fbb825fc0aae7bf4a1177b2b31fcf8a3feeaf7092761e18c859ee52a9c"
        },
        "size": 329576,
        "name": "packet_dump.pcap",
        "mime_type":"application/vnd.tcpdump.pcap",
        "content_ref": "1",
        "created": "2016-01-01T00:00:00Z",
        "modified": "2016-01-01T00:00:00Z",
        "accessed": "2016-01-01T00:00:00Z"
     },
     "1": {
       "type": "artifact",
       "mime_type": "application/vnd.tcpdump.pcap",
       "payload_bin": "VBORw0KGgoAAAANSUhEUgAAADI== ..."
     },
     ...
  }
}
```

FIG. 16

APPARATUS AND METHOD FOR SHARING SECURITY THREAT INFORMATION

CROSS REFERENCE TO RELATED APPLICATION

This application claims the benefit of Korean Patent Application No. 10-2018-0048084, filed Apr. 25, 2018, which is hereby incorporated by reference in its entirety into this application.

BACKGROUND OF THE INVENTION

1. Technical Field

The present invention relates generally to technology for sharing security threat information, and more particularly to technology for configuring an information-sharing system by systematizing security threat information related to detection of malicious files.

2. Description of Related Art

With evolving cyber threats, the importance of security is more emphasized, and security monitoring and control technology continues to be developed. Many companies use security monitoring and control platforms in order to monitor internal infrastructure and systems and to detect and respond to cyber threats that attempt to invade their internal organizations.

Security monitoring and control is configured to respond to threats by collecting, classifying, and outputting information generated by firewalls, an Intrusion Prevention System (IPS), a Network Management System (NMS), and the like and by alerting an administrator in the event of violation of a preset security policy. As representative examples of security monitoring and control platforms, there are Enterprise Security Management (ESM), a Threat Management System (TMS), Security Information and Event Management (SIEM), and the like.

Because security monitoring and control devices use information-sharing systems developed by individual vendors, information extractable by the respective devices may differ depending on the vendor, and the devices are not capable of interworking with devices developed by other vendors, or interworking therebetween is very limited. Also, when a security monitoring and control device uses a vendor's own detection rule, it is difficult to replace the device with the device of another vendor. Accordingly, national and public organizations, companies, and the like tend to depend on the security device of a specific vendor, which may waste money.

For example, when the security monitoring and control device of company A is capable of extracting only an SHA-256 hash and when the security monitoring and control device of company B is capable of extracting only an SHA-1 hash, it is difficult to standardize and use the results analyzed by the respective companies.

Also, because the detection target, the detection rule, the detection result, the information transmission method, and the like of one vendor may differ from those of other vendors, the devices of multiple vendors are not capable of interworking with each other, which causes a problem of dependency on a specific vendor.

Therefore, it is required to develop technology for standardizing security threat information and information transmission methods, which vary depending on individual vendors, thereby securing interoperability between the heterogenous information-sharing systems of different vendors.

DOCUMENTS OF RELATED ART (Patent Document 1) Korean Patent No. 10-0862194, published on Oct. 9, 2008 and titled "Apparatus and method for sharing infringement accident and network security system comprising the same".

SUMMARY OF THE INVENTION

An object of the present invention is to systematize security threat information related to the detection of malicious files, thereby enabling different vendors to share security threat information.

Another object of the present invention is to standardize security threat information and information transmission methods, which vary depending on individual vendors, thereby securing interoperability between the heterogenous information-sharing systems of different vendors.

A further object of the present invention is to secure compatibility between the detection rules of different vendors.

Yet another object of the present invention is to construct a consistent malware detection system between national and public organizations, companies, subsidiaries, and affiliates.

In order to accomplish the above objects, a method for sharing security threat information, performed by an apparatus for sharing security threat information, according to the present invention includes downloading a detection rule from a TAXII server and storing the same in a detection rule and result storage unit; performing detection for a detection target, which includes at least one of an Observed Data object, a file that is not in a STIX format, and a PCAP file, using the detection rule; generating a detection result, which is a result of the detection, using at least one of a Sighting object, a File object, and an Artifact object; and uploading the generated detection result to the TAXII server in order to share security threat information including the detection result.

Here, performing detection for the detection target may be configured to perform autonomous detection based on whether the detection target, stored in a detection target storage unit, and a valid detection rule, stored in the detection rule and result storage unit, match at least one of a STIX pattern, a YARA pattern, and a Snort pattern.

Here, performing detection for the detection target may be configured to transmit the detection rule to a legacy detection device that has an autonomous detection function and to receive the detection result from the legacy detection device, thereby sharing the security threat information including the detection rule and the detection result.

Here, performing detection for the detection target may be configured to transmit and receive the detection target, the detection rule, and the detection result to and from the legacy detection device through a STIX 2 conversion unit.

Here, performing detection for the detection target may be configured to perform detection based on the Snort pattern when the legacy detection device is any one of an Intrusion Detection System (IDS), an Intrusion Prevention System (IPS), and a firewall (FW), and to perform detection based on at least one of the STIX pattern, the YARA pattern, and the Snort pattern when the legacy detection device is a sandbox.

Here, performing detection for the detection target may be configured such that the STIX pattern is deactivated when the YARA pattern or the Snort pattern is used, such that the Snort pattern is deactivated when the YARA pattern is used, and such that the YARA pattern is deactivated when the Snort pattern is used.

Here, performing detection for the detection target may be configured such that, when the detection target is a file that is not in a STIX format, the detection is performed using metadata pertaining thereto.

Here, the metadata about the file that is not in a STIX format may include at least one of an object type for the file, the hash value of the file, the size of the file, information about the time at which the file is created, information about the time at which the file is most recently modified, and information about the time at which the file is most recently accessed.

Here, performing detection for the detection target may be configured such that, when the detection target is a PCAP file, the detection is performed using metadata pertaining thereto.

Here, the metadata about the PCAP file may include at least one of a domain name extracted from the PCAP file, IPv4 address information, URL information, and file information about the PCAP file.

Here, downloading the detection rule and storing the detection rule in the detection rule and result storage unit may be configured to encrypt the property value of a pattern including at least one of the STIX pattern, the YARA pattern, and the Snort pattern and to store the encrypted property value.

Here, information about the Sighting object may include at least one of the identifier of the Sighting object, the time at which the Sighting object is first created, the time at which the Sighting object is most recently modified, and detection rule information corresponding to the Sighting object.

Here, generating the detection result may include, when a detected file is present, generating metadata about the file using the File object; and sharing the file using the Artifact object.

Here, information about the Artifact object may include at least one of a result of BASE 64 encoding of the file and the hash value of the file.

Also, an apparatus for sharing security threat information according to an embodiment of the present invention includes a detection rule and result storage unit for storing a detection rule downloaded from a TAXII server; a detection target storage unit for storing a detection target that includes at least one of an Observed Data object, a file that is not in a STIX format, and a PCAP file; a detection unit for performing at least one of autonomous detection for the detection target and external detection using a legacy detection device based on the detection rule; a detection result generation unit for generating a detection result, which is a result of the detection performed by the detection unit, using at least one of a Sighting object, a File object, and an Artifact object; and a TAXII communication unit for uploading the generated detection result to the TAXII server in order to share security threat information including at least one of the detection rule and the detection result.

Here, the detection unit may include an autonomous detection module for performing the autonomous detection based on whether the detection target and a valid detection rule, which is stored in the detection rule and result storage unit, match at least one of a STIX pattern, a YARA pattern, and a Snort pattern; and an external detection module for performing the external detection by transmitting the detection rule to a legacy detection device that has an autonomous detection function and by receiving the detection result from the legacy detection device.

Here, when the detection target is a file that is not in a STIX format, the detection unit may perform the detection using metadata pertaining thereto, which includes at least one of an object type for the file, the hash value of the file, the size of the file, information about the time at which the file is created, information about the time at which the file is most recently modified, and information about the time at which the file is most recently accessed.

Here, when the detection target is a PCAP file, the detection unit may perform the detection using metadata pertaining thereto, which includes at least one of a domain name extracted from the PCAP file, IPv4 address information, URL information, and file information about the PCAP file.

Here, when a detected file is present, the detection result generation unit may generate metadata pertaining thereto using the File object and share the file using the Artifact object.

Here, the detection rule and result storage unit may encrypt a property value of a pattern including at least one of the STIX pattern, the YARA pattern, and the Snort pattern and store the encrypted property value.

BRIEF DESCRIPTION OF THE DRAWINGS

The above and other objects, features and advantages of the present invention will be more clearly understood from the following detailed description taken in conjunction with the accompanying drawings, in which:

FIG. 5 is a view for explaining the structure of an Observed Data object according to an embodiment of the present invention;

FIG. 6 is an exemplary view that shows code specifying an Observed Data object according to an embodiment of the present invention;

FIG. 7 is a view for explaining the structure of a detection rule according to an embodiment of the present invention;

FIG. 8 is an exemplary view that shows code specifying a detection rule according to an embodiment of the present invention;

FIG. 9 is a view for explaining the structure of metadata about a file according to an embodiment of the present invention;

FIG. 10 is an exemplary view that shows code specifying metadata about a file according to an embodiment of the present invention;

FIG. 11 is a view for explaining the structure of metadata about Packet Capture (PCAP) according to an embodiment of the present invention;

FIG. 12 is an exemplary view that shows code specifying metadata about PCAP according to an embodiment of the present invention;

FIG. 13 is a view for explaining the structure of a detection result according to an embodiment of the present invention;

FIG. 14 is an exemplary view that shows code specifying a detection result according to an embodiment of the present invention;

FIG. 15 is a view for explaining the structure of an Artifact object according to an embodiment of the present invention;

FIG. 16 is an exemplary view that shows code specifying a File object and an Artifact object according to an embodiment of the present invention.

DESCRIPTION OF THE PREFERRED EMBODIMENTS

Figure 1:
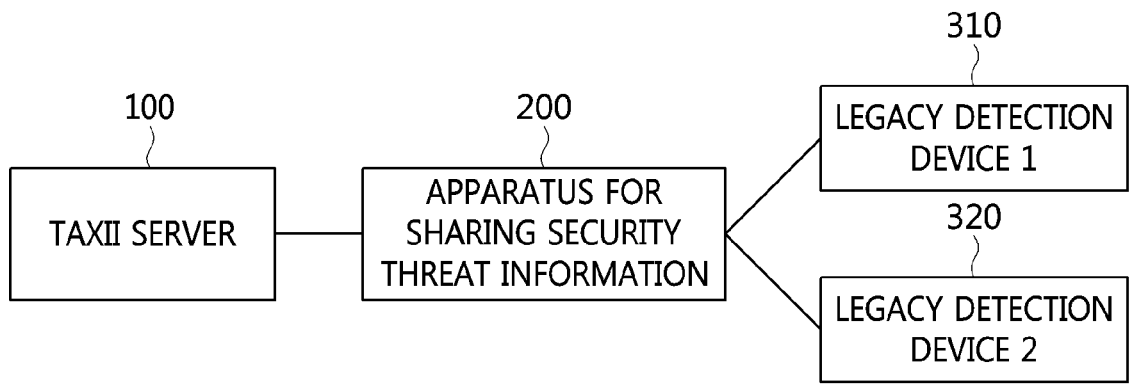
FIG. 1 is a view that schematically shows an environment in which an apparatus for sharing security threat information is applied according to an embodiment of the present invention.

Because the present invention may be variously changed and may have various embodiments, specific embodiments will be described in detail below with reference to the attached drawings.

However, it should be understood that those embodiments are not intended to limit the present invention to specific disclosure forms and that they include all changes, equivalents or modifications included in the spirit and scope of the present invention.

The terms used in the present specification are merely used to describe specific embodiments, and are not intended to limit the present invention. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless differently defined, all terms used here, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, a preferred embodiment of the present invention will be described in detail with reference to the accompanying drawings. In the following description of the present invention, the same reference numerals are used to designate the same or similar elements throughout the drawings, and repeated descriptions of the same components will be omitted.

FIG. 1 is a view that schematically shows an environment in which an apparatus for sharing security threat information is applied according to an embodiment of the present invention.

The apparatus 200 for sharing security threat information is aimed at securing interoperability between information-sharing systems of different vendors. As shown in FIG. 1, the apparatus 200 for sharing security threat information shares security threat information with a Trusted Automated eXchange of Indicator Information (TAXII) server 100 and legacy detection devices 310 and 320.

Here, the security threat information may include at least one of a detection target, a detection rule, and a detection result. The apparatus 200 for sharing security threat information standardizes security threat information and a method for transmitting security threat information, thereby securing interoperability between the information-sharing systems of the TAXII server 100 and the legacy detection devices 310 and 320.

Here, the apparatus 200 for sharing security threat information may standardize security threat information based on Structured Threat Information Expression (STIX) 2, which is an international standard. That is, the apparatus 200 for sharing security threat information configures security threat information by standardizing the same and sends the security threat information, standardized based on STIX 2, to a tool, thereby securing interoperability, compatibility, and flexibility between heterogeneous information-sharing systems.

In FIG. 1, the TAXII server 100 distributes a detection rule to the apparatus 200 for sharing security threat information, collects detection results therefrom, and stores the detection rule and the detection results.

The apparatus 200 for sharing security threat information downloads a detection rule from the TAXII server 100, stores the same, and performs at least one of autonomous detection and external detection using the detection rule.

The apparatus 200 for sharing security threat information may perform autonomous detection using a detection target stored in detection target storage. Also, the apparatus 200 for sharing security threat information may transmit a detection rule to the legacy detection devices 310 and 320 and receive detection results therefrom.

Each of the legacy detection devices 310 and 320 may be an Intrusion Detection System (IDS), an Intrusion Prevention System (IPS), a firewall (FW), a sandbox, or the like. The legacy detection devices 310 and 320 perform detection based on the detection rule received from the apparatus 200 for sharing security threat information and transmit detection results thereto. In FIG. 1, the first legacy detection device 310 may be a device that supports STIX, but the second legacy detection device 320 may be a device that does not support STIX.

For convenience of description, although the apparatus 200 for sharing security threat information has been described as performing detection using a detection rule downloaded from the TAXII server 100 and uploading detection results thereto in FIG. 1, the TAXII server 100 may be an information-sharing system for creating a detection rule and checking detection results.

Also, the apparatus 200 for sharing security threat information has been described as transmitting a detection rule to the legacy detection devices 310 and 320 and receiving detection results from the legacy detection devices 310 and 320, which performed detection, but without limitation thereto, each of the legacy detection devices 310 and 320 may be a detection system, such as an IDS/IPS, a FW, a sandbox, or the like.

The apparatus 200 for sharing security threat information may use the TAXII 2 standard in order to interwork with the same information-sharing system including the TAXII server 100 by sharing security threat information including a detection target, a detection rule, and a detection result therewith.

Systems that interwork with an information-sharing system may form a hierarchical structure. For example, assume that there are a first associated organization interworking with the information-sharing system of national and public organizations and a second associated organization under the first associated organization. Here, the first and second associated organizations function as the subsystems of the information-sharing system of the national and public organizations and interwork therewith.

In such a hierarchical structure, the apparatus 200 for sharing security threat information may distribute the detection rule of the first associated organization to the second associated organization, which is under the first associated organization, and may enable detection in which the characteristics of the organization are reflected. Also, detection results may be managed for respective organizations under the first associated organization, and sensitive information may be prevented from being exposed to external organizations in a structured manner.

That is, the apparatus 200 for sharing security threat information according to an embodiment of the present invention may construct a consistent malware detection system between national and public organization, companies, subsidiaries, and affiliates.

Hereinafter, the configuration of an apparatus for sharing security threat information according to an embodiment of the present invention will be described in detail with reference to FIG. 2.

Figure 2:
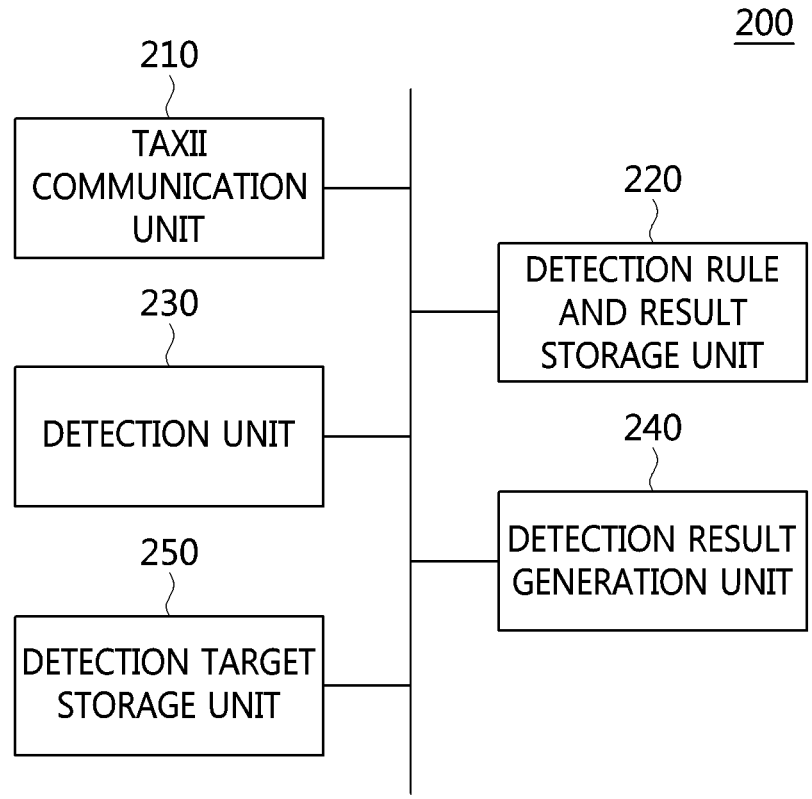
FIG. 2 is a block diagram that shows the configuration of an apparatus for sharing security threat information according to an embodiment of the present invention.

FIG. 2 is a block diagram that shows the configuration of an apparatus for sharing security threat information according to an embodiment of the present invention.

As illustrated in FIG. 2, the apparatus 200 for sharing security threat information includes a TAXII communication unit 210, a detection rule and result storage unit 220, a detection unit 230, a detection result generation unit 240, and a detection target storage unit 250.

First, the TAXII communication unit 210 communicates with the TAXII server 100. Particularly, the TAXII communication unit 210 may download a detection rule from the TAXII server 100 and upload a detection result thereto.

The detection rule and result storage unit 220 standardizes and stores a detection rule, which is downloaded from the TAXII server 100, and a detection result, which is the result of detection performed based on the detection rule.

Also, the detection rule and result storage unit 220 may store the detection rule after encrypting the same in order to improve security when it stores and transmit the detection rule. Here, the detection rule and result storage unit 220 may encrypt at least one of a detection pattern (a pattern property), the YARA pattern (an x_yara_pattern property), and the Snort pattern (an x_snort_pattern property) and store the same in order to comply with the TAXII 2 standard.

Here, the detection rule and result storage unit 220 may encrypt the detection rule using any of various methods for encryption/decryption, and the encryption method used herein is not limited to a specific encryption method.

The structure of a standardized detection rule according to an embodiment of the present invention is as shown in FIG. 7, which will be described later. Also, the standardized detection rule will be described in detail later with reference to FIG. 7 and FIG. 8.

The detection unit 230 performs at least one of autonomous detection for the detection target and external detection using external detection devices 310 and 320 based on a detection rule. Here, the detection target may include at least one of an Observed Data object, a file that is not in a STIX format, and a PCAP file.

When the detection target is a file that is not in a STIX format, the detection unit 230 may perform detection using metadata pertaining thereto. When the detection target is a PCAP file, the detection unit 230 may perform detection using metadata pertaining thereto.

Also, the detection unit 230 may include an autonomous detection module and an external detection module. The autonomous detection module compares the detection target stored in the detection target storage unit 250 with a valid detection rule stored in the detection rule and result storage unit 220, thereby performing autonomous detection based on whether the detection target matches any of the STIX pattern, the YARA pattern, and the Snort pattern.

Also, the external detection module of the detection unit 230 transmits a detection rule to the detection devices 310 and 320, which are capable of performing detection by themselves, and receives detection results therefrom, thereby performing external detection.

In order to minimize unnecessary replacement of equipment and to make use of existing detection systems that are being used by national and public organizations and companies, the apparatus 200 for sharing security threat information configures an interworking interface.

When the existing detection system is a legacy detection device 320 that does not support STIX 2, the detection unit 230 may use a STIX 2 converter, which interprets the input/output of the legacy detection device 320, in order to transmit and receive security threat information including at least one of a detection target, a detection rule, and a detection result, thereby enabling the legacy detection device 320 to interwork with the apparatus 200 for sharing security threat information.

Also, metadata about a file that is used for detection and metadata about a PCAP file will be described in detail later with reference to FIGS. 9 to 12.

The detection result generation unit 240 generates a detection result using at least one of a Sighting object, a File object, and an Artifact object. Also, when a detected file is present, the detection result generation unit 240 may generate metadata pertaining thereto using a File object and share the file using an Artifact object.

The structure of a standardized detection result according to an embodiment of the present invention will be described in detail later with reference to FIG. 13 and FIG. 14, and a File object and an Artifact object will be described in detail later with reference to FIG. 15 and FIG. 16.

The detection target storage unit 250 stores a detection target that includes at least one of an Observed Data object, a file that is not in a STIX format, and a PCAP file. The detection target stored in the detection target storage unit 250 is used when the detection unit 230 performs autonomous detection.

The structure of a standardized detection target according to an embodiment of the present invention will be described in detail later with reference to FIG. 5 and FIG. 6.

Hereinafter, a method for sharing security threat information, performed by an apparatus 200 for sharing security threat information, according to an embodiment of the present invention will be descried in detail with reference to FIG. 3.

Figure 3:
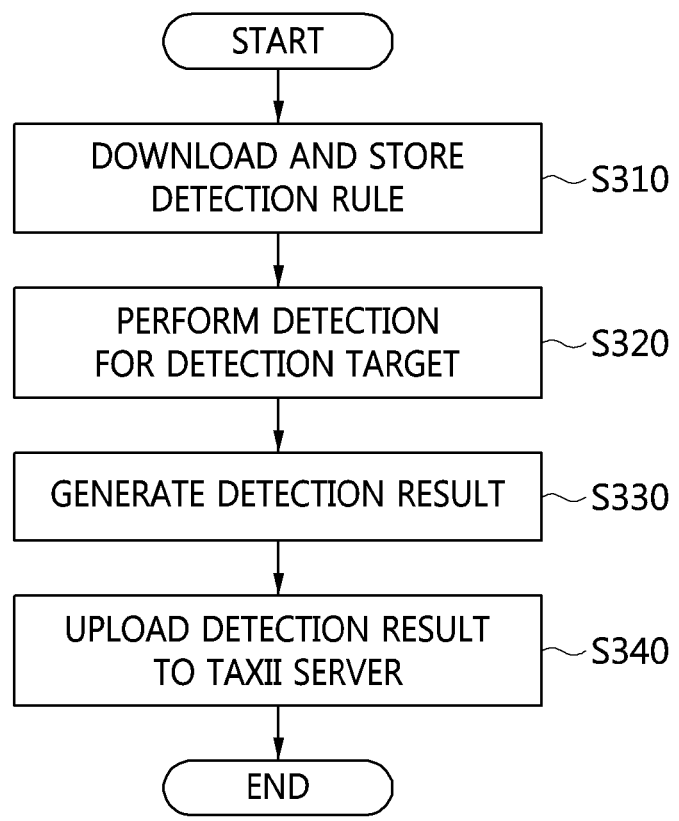
FIG. 3 is a flowchart for explaining a method for sharing security threat information according to an embodiment of the present invention.

FIG. 3 is a flowchart for explaining a method for sharing security threat information according to an embodiment of the present invention.

First, the apparatus 200 for sharing security threat information downloads a detection rule from a TAXII server 100 and stores the same at step S310.

The apparatus 200 for sharing security threat information may store the detection rule downloaded from the TAXII server 100 after standardizing the same, and may encrypt the detection rule before storing the same in order to improve the security thereof.

Here, in order to comply with the TAXII 2 standard, the apparatus 200 for sharing security threat information may encrypt at least one of a detection pattern (a pattern property), the YARA pattern (an x_yara_pattern property), and the Snort pattern (an x_snort_pattern property), among the properties of the detection rule, and may then store the same.

Then, the apparatus 200 for sharing security threat information performs detection for the detection target at step S320.

The apparatus 200 for sharing security threat information may perform autonomous detection for the detection target based on a valid detection rule, among the stored detection rules, or may perform external detection using external detection devices 310 and 320.

The apparatus 200 for sharing security threat information may perform detection for the detection target that includes at least one of an Observed Data object, a file that is not in a STIX format and a PCAP file, and may perform detection using metadata when the detection target is a file that is not in a STIX format or a PCAP file.

That is, when the detection target is a file that is not in a STIX format, the apparatus 200 for sharing security threat information performs detection using metadata pertaining thereto, and when the detection target is a PCAP file, the apparatus 200 for sharing security threat information may perform detection using metadata pertaining thereto.

Then, the apparatus 200 for sharing security threat information generates a detection result at step S330.

The apparatus 200 for sharing security threat information may generate a detection result based on the result of detection performed at step S320 and store the detection result.

Finally, the apparatus 200 for sharing security threat information uploads the detection result to the TAXII server at step S340.

As described above, the apparatus 200 for sharing security threat information according to an embodiment of the present invention downloads a detection rule from the TAXII sever 100 and delivers the same to the external detection devices 310 and 320, and delivers the result of detection performed by itself or the detection result from the external detection devices 310 and 320 to the TAXII server 100, thereby enabling security threat information to be shared between the information-sharing system and the detection systems.

Hereinafter, a system for sharing security threat information according to an embodiment of the present invention will be described in detail with reference to FIG. 4.

Figure 4:
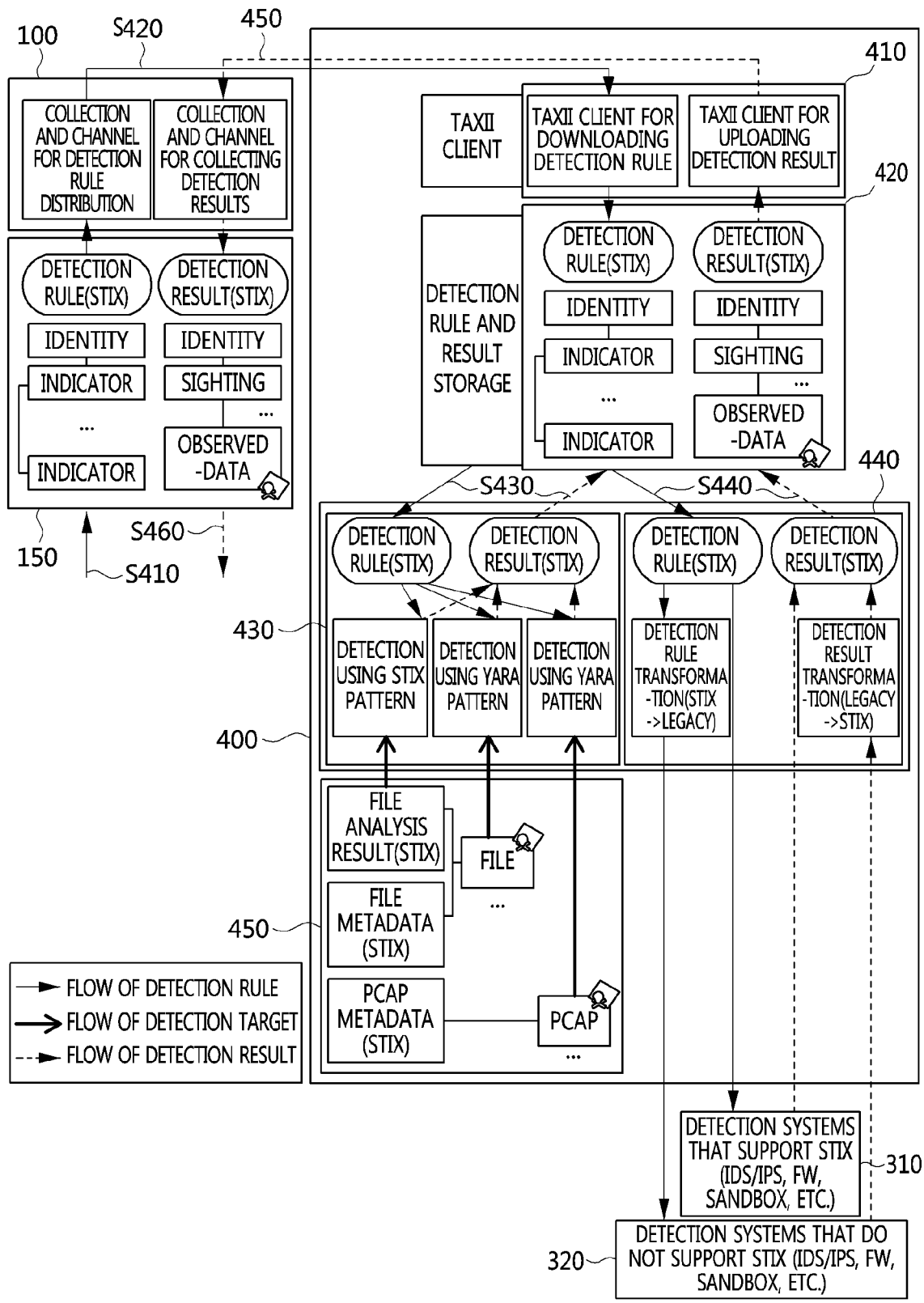
FIG. 4 is a view that shows an example of a system for sharing security threat information according to an embodiment of the present invention.

FIG. 4 is a view that shows an example of a system for sharing security threat information according to an embodiment of the present invention.

As shown in FIG. 4, the system for sharing security threat information includes a TAXII server 100, external detection devices 310 and 320, and an apparatus 400 for sharing security threat information.

The generated detection rule is stored in detection rule and result storage 150 at step S410. The TAXII server 100 transmits the detection rule stored in the detection rule and result storage 150 to the apparatus 400 for sharing security threat information at step S420.

The apparatus 400 for sharing security threat information downloads the detection rule from the TAXII server 100 through a TAXII client 410. Then, the apparatus 400 for sharing security threat information may perform autonomous detection at step S430, perform external detection at step S440, and store the results of detection in detection rule and result storage 420.

The autonomous detection unit 430 of the apparatus 400 for sharing security threat information may perform autonomous detection for the detection target stored in detection target storage 450, and the external detection unit 440 thereof may perform detection using the external detection devices 310 and 320.

Here, the apparatus 400 for sharing security threat information may transmit the detection rule to at least one of the external detection device 310 that supports STIX and the external detection device 320 that does not support STIX, and may receive detection results therefrom.

When the external detection device 320 that does not support STIX is any one of an IDS, an IPS, and a FW, interworking therewith is performed using the Snort pattern, in which case a detection result may be in a STIX format or a PCAP format. When the external detection device 320 that does not support STIX is a sandbox, interworking therewith is performed using STIX, YARA, and Snort patterns, in which case the detection result may be a file, or may be data in a STIX format or PCAP format.

In FIG. 4, the apparatus 400 for sharing security threat information may use a STIX 2 property expression method in order to configure data about the detection target, the detection rule, and the detection result. The properties of a detection target include information about the use of a STIX Observed Data object, generation of metadata about a file, and generation of metadata about a PCAP file. Here, information about generation of metadata about a file and generation of metadata about a PCAP file, which is optionally used in STIX 2, may be included as essential components.

The properties of a detection rule specify whether the detection rule complies with the STIX 2 standard, and may additionally include information about whether the YARA pattern and the Snort pattern are supported. Also, the properties of a detection result may include the summary thereof, the actual file corresponding to the detection target, and information about the bundle of detection results using a STIX bundle object as essential components thereof.

The apparatus 400 for sharing security threat information may mandatorily perform autonomous detection, classification of detection targets based on a detection rule, recognition of a detection target during the term of validity, and counting the number of times autonomous detection is performed. Also, the apparatus 400 for sharing security threat information may optionally perform at least one of external detection, automated detection, automated sharing of detection results, detection using the YARA pattern, and detection using the Snort pattern.

Hereinafter, the structure of security threat information according to an embodiment of the present invention will be described in detail with reference to FIGS. 5 to 16.

FIG. 5 is a view for explaining the structure of an Observed Data object according to an embodiment of the present invention, and FIG. 6 is an exemplary view that shows code specifying an Observed Data object according to an embodiment of the present invention.

Observed data is used to define a main detection target, among security threat information, and is defined based on an Observed Data object of STIX 2.

As shown in FIG. 5 and FIG. 6, the properties of an Observed Data object may include an object type (a type property), the identifier of the Observed Data object (an id property), the identifier of the detection server that created the Observed Data object (a created_by_ref property), information about the time at which the Observed Data object was first created (a created property), information about the time at which the Observed Data object was most recently modified (a modified property), information about the time at which the Observed Data object was first observed (a first_observed property), information about the time at which the Observed Data object was most recently observed (a last_observed property), the number of times the Observed Data object was observed (a number_observed property), and observable objects corresponding to the Observed Data object (an objects property).

FIG. 7 is a view for explaining the structure of a detection rule according to an embodiment of the present invention, and FIG. 8 is an exemplary view that shows code specifying a detection rule according to an embodiment of the present invention.

As shown in FIG. 7 and FIG. 8, the apparatus 200 for sharing security threat information according to an embodiment of the present invention supports a YARA pattern and a Snort pattern.

The YARA pattern and the Snort pattern are not supported in the STIX 2 standard, but are used as de-facto standards in information-sharing systems. In order to improve the efficiency of information-sharing systems, the apparatus 200 for sharing security threat information accommodates the YARA pattern and the Snort pattern and defines the same as STIX 2 custom properties. Here, the YARA pattern uses an x_yara_pattern property, and the Snort pattern uses an x_snort_pattern property.

The properties of the detection rule defined as an Indicator object may include an object type (a type property), the identifier of the Indicator object (an id property), the identifier of an Identity object describing the entity that created the Indicator object (a created_by_ref property), information about the time at which the Indicator object was first created (a created property), information about the time at which the Indicator object was most recently modified (a modified property), information about whether the Indicator object was revoked (a revoked property), the vocabulary that specifies the type of the Indicator object (a labels property), the name of the Indicator object (a name property), a description of the Indicator object (a description property), a STIX pattern (a pattern property), a YARA pattern (an x_yara_pattern property), a Snort pattern (an x_snort_pattern property), the period for which the Indicator is useful (valid_from and valid_until properties), and reference information for the Indicator object (an object_marking_refs property).

The revoked property, which indicates whether the Indicator object was revoked, may have a Boolean value. When the value of the revoked property is 'true', the Indicator object is determined to be revoked. Also, when the x_yara_pattern property or the x_snort_pattern property is used, the pattern property, which indicates the STIX pattern, is ignored, in which case either the x_yara_pattern property or the x_snort_pattern property may be used.

FIG. 8 shows code in which the x_yara_pattern property is used and the pattern property corresponding to the STIX pattern is ignored, and the exemplary code shown in FIG. 8 is code for detection using the YARA pattern.

FIG. 9 is a view for explaining the structure of metadata about a file according to an embodiment of the present invention, and FIG. 10 is an exemplary view that shows code specifying metadata about a file according to an embodiment of the present invention.

When a file that is not in a STIX format is used as a detection target, the apparatus 200 for sharing security threat information according to an embodiment of the present invention generates metadata about the file that is not in a STIX format. The generated metadata about the file is used to perform detection. Here, the metadata about the file is generated in advance, thereby reducing detection overhead.

As shown in FIG. 9 and FIG. 10, the properties of metadata about a file may include an object type (a type property), the hash value of the file (a hashes property), the size of the file (a size property), the name of the file (a name property), the MIME type of the file (a mime_type property), information about the time at which the file was created (a created property), information about the time at which the file was most recently modified (a modified property), and information about the time at which the file was most recently accessed (an accessed property). Here, the metadata about the file may include three types of hash values of the file, specifically, MD5, SHA-1, and SHA-256, as the 'hashes' property.

FIG. 11 is a view for explaining the structure of metadata about Packet Capture (PCAP) according to an embodiment of the present invention, and FIG. 12 is an exemplary view that shows code specifying metadata about PCAP according to an embodiment of the present invention.

When a PCAP file is input as a detection target, the apparatus 200 for sharing security threat information according to an embodiment of the present invention generates metadata about packet information in a STIX format. Here, the generated metadata about the PCAP file is used to perform detection, in which case the apparatus 200 for sharing security threat information may speed up detection by reducing detection overhead because it performs detection by referring to metadata in a STIX format, rather than using a Snort engine.

As shown in FIG. 11 and FIG. 12, metadata about PCAP includes a domain name extracted from the DNS packet of PCAP (a domain-name property), an IPv4 address extracted from an IP packet (an ipv4-addr property), and a URL extracted from an HTTP packet (a url property). Here, the value of the url property represents the entire URL including protocol://domain/.

Also, the hash values of the PCAP file (a hashes property), the size thereof (a size property), the name thereof (a name property), the MIME type thereof (a mime_type property), information about the time at which the PCAP file was created (a created property), information about the time at which the PCAP file was most recently modified (a modified property), and information about the time at which the PCAP file was most recently accessed (an accessed property) may be included as the properties of the PCAP file.

FIG. 13 is a view for explaining the structure of a detection result according to an embodiment of the present invention, and FIG. 14 is an exemplary view that shows code specifying a detection result according to an embodiment of the present invention.

As shown in FIG. 13 and FIG. 14, the apparatus 200 for sharing security threat information according to an embodiment of the present invention may generate a detection result using at least one of a Sighting object, a File object, and an Artifact object. The basic detection result is generated using a Sighting object. However, when a detected file is present, metadata pertaining thereto may be recorded using a File object, and the corresponding file may be shared using an Artifact object.

A Sighting object may include an object type (a type property), the identifier of the Sighting object (an id property), the identifier of an Identity object describing the entity that created the Sighting object (a created_by_ref property), information about the time at which the Sighting object was created (a created property), information about the time at which the Sighting object was most recently modified (a modified property), information about whether the Sighting object was revoked (a revoked property), information about the time at which the Sighting object was first observed (a first_seen property), information about the time at which the Sighting object was most recently observed (a last_seen property), the number of times the Sighting object was observed (a count property), the identifier of the Indicator object corresponding to the Sighting object (a sighting_of_ref property), the list of identifiers of Observed Data objects that are detected (an observed_data_refs property), and the list of identifiers of entities that sighted the targets (a where_sighted_refs property) as the properties thereof.

FIG. 15 is a view for explaining the structure of an Artifact object according to an embodiment of the present invention, and FIG. 16 is an exemplary view that shows code specifying a File object and an Artifact object according to an embodiment of the present invention.

As shown in FIG. 15 and FIG. 16, the properties of an Artifact object may include an object type (a type property), the MIME type of the Artifact object (a mime_type property), a result of BASE 64 encoding of a detected file (a payload_bin property), and the hash values of the detected target (a hashes property).

An embodiment of the present invention may be implemented in a computer system including a computer-readable recording medium. The computer system may include one ore more processors, memory, a user-interface input device, a user-interface output device, and storage, which communicate with each other via a bus. Also, the computer system may further include a network interface that is connected to a network. The processor may be a central processing unit or a semiconductor device for executing processing instructions stored in the memory or the storage. The memory and the storage may be various types of volatile or nonvolatile storage media. For example, the memory may include ROM or RAM.

Accordingly, an embodiment of the present invention may be implemented as a nonvolatile computer-readable storage medium in which methods implemented using a computer or instructions executable in a computer are recorded. When the computer-readable instructions are executed by a processor, the computer-readable instructions may perform a method according to at least one aspect of the present invention.

Figure 17:
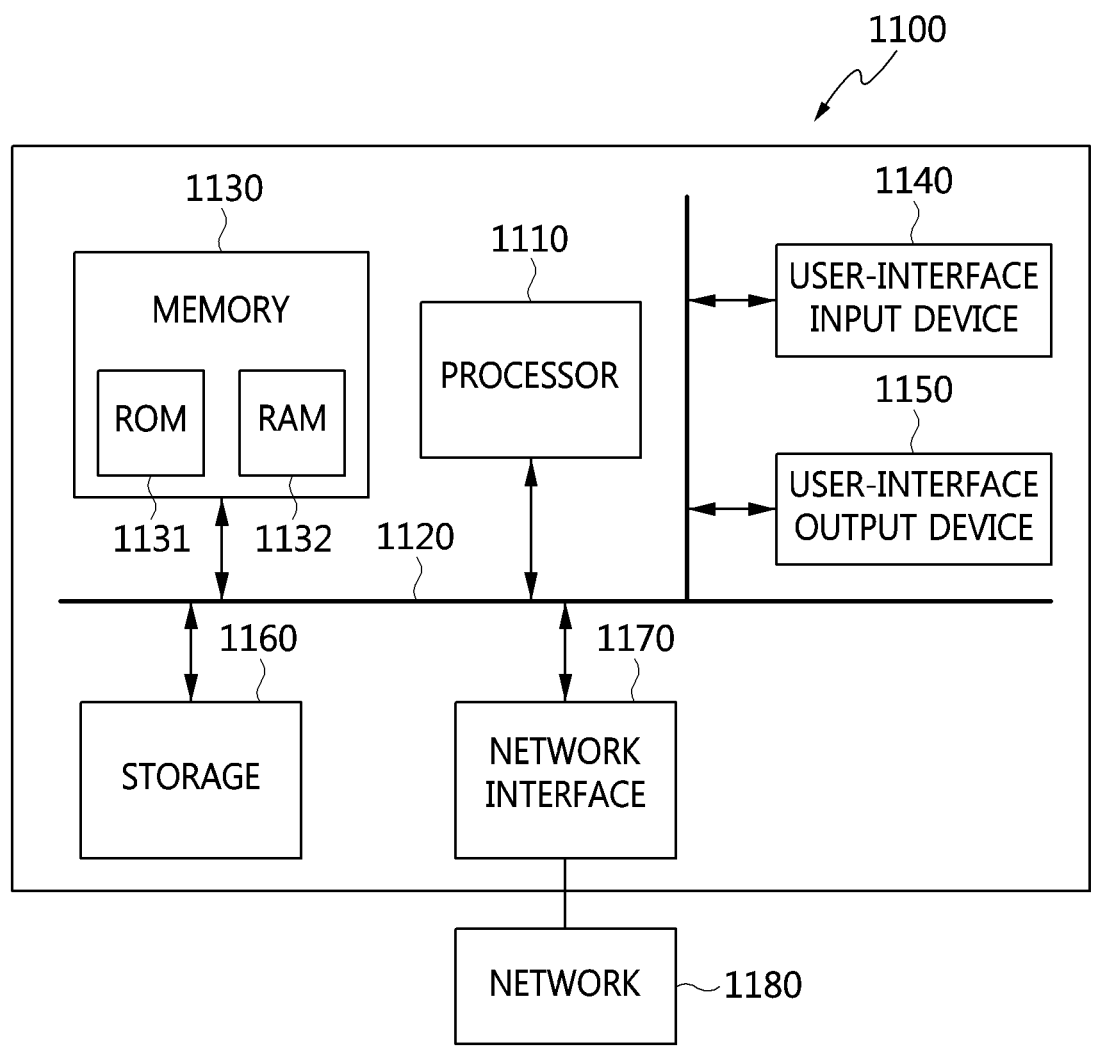
FIG. 17 is a diagram illustrating a computer system according to an embodiment of the present invention.

FIG. 17 is a diagram illustrating a computer system according to an embodiment of the present invention.

Referring to FIG. 17, the apparatus for sharing security threat information according to an embodiment of the present invention may be implemented in a computer system 1100 such as a computer-readable storage medium. As illustrated in FIG. 17, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

According to the present invention, security threat information related to detection of malicious files is systematized, whereby different vendors may share the security threat information.

Also, according to the present invention, interoperability between the heterogenous information-sharing systems of different vendors may be secured by standardizing security threat information and information transmission methods, which vary depending on individual vendors.

Also, according to the present invention, compatibility between the detection rules of different vendors may be secured.

Also, according to the present invention, it is possible to construct a consistent malware detection system between national and public organizations, companies, subsidiaries, and affiliates.

As described above, the apparatus and method for sharing security threat information according to the present invention are not limitedly applied to the configurations and operations of the above-described embodiments, but all or some of the embodiments may be selectively combined and configured, so that the embodiments may be modified in various ways.

What is claimed is:

1. A method for sharing security threat information, performed by an apparatus for sharing security threat information, comprising:
   downloading a detection rule from a TAXII server and storing the detection rule in a detection rule and result storage unit;
   performing detection for a detection target, which includes at least one of an Observed Data object, a file that is not in a STIX format, and a PCAP file, using the detection rule;
   generating a detection result, which is a result of the detection, using at least one of a Sighting object, a File object, and an Artifact object; and
   uploading the generated detection result to the TAXII server in order to share security threat information including the detection result,
   wherein performing detection for the detection target is configured to perform autonomous detection based on whether the detection target, stored in a detection target storage unit, and a valid detection rule, stored in the detection rule and result storage unit, match at least one of a STIX pattern, a YARA pattern, and a Snort pattern,
   wherein performing detection for the detection target is configured to transmit the detection rule to a legacy detection device that has an autonomous detection function and to receive the detection result from the legacy detection device, thereby sharing the security threat information including the detection rule and the detection result.

2. The method of claim 1, wherein performing detection for the detection target is configured to transmit and receive the detection target, the detection rule, and the detection result to and from the legacy detection device through a STIX 2 conversion unit.

3. The method of claim 2, wherein performing detection for the detection target is configured to perform detection based on the Snort pattern when the legacy detection device is any one of an Intrusion Detection System (IDS), an Intrusion Prevention System (IPS), and a firewall (FW), and to perform detection based on at least one of the STIX pattern, the YARA pattern, and the Snort pattern when the legacy detection device is a sandbox.

4. The method of claim 1, wherein performing detection for the detection target is configured such that the STIX pattern is deactivated when the YARA pattern or the Snort pattern is used, such that the Snort pattern is deactivated when the YARA pattern is used, and such that the YARA pattern is deactivated when the Snort pattern is used.

5. The method of claim 1, wherein performing detection for the detection target is configured such that, when the detection target is a file that is not in a STIX format, the detection is performed using metadata pertaining thereto.

6. The method of claim 5, wherein the metadata about the file that is not in a STIX format includes at least one of an object type for the file, a hash value of the file, a size of the file, information about a time at which the file is created, information about a time at which the file is most recently modified, and information about a time at which the file is most recently accessed.

7. The method of claim 1, wherein performing detection for the detection target is configured such that, when the detection target is a PCAP file, the detection is performed using metadata pertaining thereto.

8. The method of claim 7, wherein the metadata about the PCAP file includes at least one of a domain name extracted from the PCAP file, IPv4 address information, URL information, and file information about the PCAP file.

9. The method of claim 1, wherein downloading the detection rule and storing the detection rule in the detection rule and result storage unit is configured to encrypt a property value of a pattern including at least one of the STIX pattern, the YARA pattern, and the Snort pattern and to store the encrypted property value.

10. The method of claim 1, wherein information about the Sighting object includes at least one of an identifier of the Sighting object, a time at which the Sighting object is first created, a time at which the Sighting object is most recently modified, and detection rule information corresponding to the Sighting object.

11. The method of claim 10, wherein generating the detection result comprises:
when a detected file is present, generating metadata about the file using the File object; and
sharing the file using the Artifact object.

12. The method of claim 11, wherein information about the Artifact object includes at least one of a result of BASE 64 encoding of the file and a hash value of the file.

13. An apparatus for sharing security threat information, comprising:
a detection rule and result storage unit for storing a detection rule downloaded from a TAXII server;
a detection target storage unit for storing a detection target that includes at least one of an Observed Data object, a file that is not in a STIX format, and a PCAP file;
a detection unit for performing at least one of autonomous detection for the detection target and external detection using a legacy detection device based on the detection rule;
a detection result generation unit for generating a detection result, which is a result of the detection performed by the detection unit, using at least one of a Sighting object, a File object, and an Artifact object; and
a TAXII communication unit for uploading the generated detection result to the TAXII server in order to share security threat information including at least one of the detection rule and the detection result,
wherein the detection unit comprises:
an autonomous detection module for performing the autonomous detection based on whether the detection target and a valid detection rule, which is stored in the detection rule and result storage unit, match at least one of a STIX pattern, a YARA pattern, and a Snort pattern; and
an external detection module for performing the external detection by transmitting the detection rule to a legacy detection device that has an autonomous detection function and by receiving the detection result from the legacy detection device.

14. The apparatus of claim 13, wherein, when the detection target is a file that is not in a STIX format, the detection unit performs the detection using metadata pertaining thereto, which includes at least one of an object type for the file, a hash value of the file, a size of the file, information about a time at which the file is created, information about a time at which the file is most recently modified, and information about a time at which the file is most recently accessed.

15. The apparatus of claim 13, wherein, when the detection target is a PCAP file, the detection unit performs the detection using metadata pertaining thereto, which includes at least one of a domain name extracted from the PCAP file, IPv4 address information, URL information, and file information about the PCAP file.

16. The apparatus of claim 13, wherein, when a detected file is present, the detection result generation unit generates metadata pertaining thereto using the File object and shares the file using the Artifact object.

17. The apparatus of claim 13, wherein the detection rule and result storage unit encrypts a property value of a pattern including at least one of the STIX pattern, the YARA pattern, and the Snort pattern and stores the encrypted property value.

* * * * *